(12) United States Patent
Sasaki

(10) Patent No.: US 7,126,763 B2
(45) Date of Patent: Oct. 24, 2006

(54) LENS MOVING MECHANISM

(75) Inventor: Takamitsu Sasaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 17 days.

(21) Appl. No.: 11/047,694

(22) Filed: Feb. 2, 2005

(65) Prior Publication Data

US 2005/0168847 A1    Aug. 4, 2005

(30) Foreign Application Priority Data

Feb. 3, 2004    (JP)    .............................. 2004-027356

(51) Int. Cl.
*G02B 15/14*    (2006.01)
(52) U.S. Cl. ...................... 359/696; 359/823
(58) Field of Classification Search ................ 359/696, 359/823
See application file for complete search history.

(56) References Cited

U.S. PATENT DOCUMENTS

| 6,570,717 B1 * | 5/2003 | Tu et al. ...................... 359/696 |
| 6,714,357 B1 | 3/2004 | Yamazaki |
| 6,813,441 B1 | 11/2004 | Yamazaki |

FOREIGN PATENT DOCUMENTS

| JP | 5-27149 | 2/1993 |
| JP | 5-341168 | 12/1993 |
| JP | 11-72688 | 3/1999 |

\* cited by examiner

*Primary Examiner*—Hung Xuen Dang
*Assistant Examiner*—Joseph Martinez
(74) *Attorney, Agent, or Firm*—Greenblum & Bernstein, P.L.C.

(57) ABSTRACT

A lens moving mechanism includes a lens frame holding a lens; a guide shaft for slidably supporting the lens frame, the guide shaft extending parallel with the optical axis, a lead screw extending parallel to the guide shaft for moving the lens frame linearly via rotation of the lead screw; a pair of bearing arms provided on the lens frame spaced from one another in a direction parallel with the guide shaft; and a screw-engagement follower located between the bearing arms and provided separately from the lens frame, the screw-engagement follower provided with a screw-engagement portion engaging with the lead screw. The guide shaft is inserted in the bearing arms and the screw-engagement follower. The screw-engagement follower is integrally provided with an elastically deformable leg which abuts against an inner surface of a bearing arm to absorb play between the screw-engagement follower and the bearing arms.

10 Claims, 4 Drawing Sheets

LENS MOVING MECHANISM

BACKGROUND OF THE INVENTION

1. Field of the Invention

The present invention relates to a lens moving mechanism for linearly moving a lens in an optical axis direction via a rotational lead screw.

2. Description of the Related Art

In a known lens moving mechanism using a lead screw, a lens frame which holds a lens is slidably attached to a guide shaft extending parallel with the optical axis so as not to rotate. The lens frame is provided with a screw-engagement portion which engages with the lead screw extending parallel with the guide shaft.

In this lens moving mechanism, a compression coil spring is provided to bias the lens frame in the optical axis direction in order to eliminate backlash between the lead screw and the lens frame. However, as the amount of compression of the compression coil spring varies in accordance with the movement of the lens frame, the load applied to a motor which drives the lead screw varies accordingly. Furthermore, as a space for accommodating the compression coil spring in the optical axis direction is necessary, it is difficult to miniaturize the lens moving mechanism.

In another type of lens moving mechanism, a screw-engagement body which engages with the lead screw is constructed separately from the lens frame. In this type of lens moving mechanism, another compression spring is necessary to absorb play between the screw-engagement body (screw-engagement follower) and the lens frame. Therefore, it is necessary to provide a space in which the compression spring is accommodated in the optical axis direction and a space in which a support shaft of the engagement follower is supported. Consequently, it is difficult to miniaturize the lens moving mechanism. There is continuous need for miniaturization of a camera in which such a lens moving mechanism is incorporated. However, conventional lens moving mechanisms cannot satisfy the need for further miniaturization of a camera.

SUMMARY OF THE INVENTION

The present invention provides a small lens moving mechanism in which a lens frame can be precisely moved.

According to the present invention, a lens moving mechanism is provided, including a lens frame which holds a lens; a guide shaft for slidably supporting the lens frame, the guide shaft extending parallel with an optical axis of the lens; a lead screw which extends parallel to the guide shaft for moving the lens frame linearly via a rotational force of the lead screw; a pair of bearing arms provided on the lens frame spaced from one another in a direction parallel with the guide shaft; and a screw-engagement follower which is located between the pair of bearing arms and is provided separately from the lens frame, the screw-engagement follower being provided with a screw-engagement portion which engages with the lead screw. The guide shaft is relatively movably inserted in both the pair of bearing arms and the screw-engagement follower. The screw-engagement follower is integrally provided with an elastically deformable leg which elastically abuts against an inner surface of one of the pair of bearing arms to absorb play between the screw-engagement follower and the pair of bearing arms.

It is desirable for the screw-engagement follower to be made of synthetic resin.

It is desirable for the elastically deformable leg to be provided with a through-hole in which the guide shaft is loosely inserted so as to move relative thereto.

It is desirable for at least one of the elastically deformable leg of the screw-engagement follower and an adjacent one of the pair of bearing arms, against which the elastically deformable leg abuts, to be provided with a flexure providing projection which abuts against the other of the elastically deformable leg and the adjacent bearing arm to provide a flexure thereto.

It is desirable for the screw engagement portion of the screw-engagement follower, in which the lead screw is located, to have a U-shaped cross section, wherein a pair of parallel plates defining the U-shaped cross section are provided, on at least one of opposed inner surfaces thereof, with rack teeth which engage with the lead screw.

In an embodiment, a lens moving mechanism is provided, including a lens frame which holds a lens, the lens frame being provided with a pair of bearing arms which are spaced from one another in an optical axis direction; a screw-engagement follower which is located between the pair of bearing arms and is provided separately from the lens frame, the screw-engagement follower being linearly moved by rotating a lead screw extending in the optical axis direction; an elastically deformable leg which is provided integrally with the screw-engagement follower, the elastically deformable leg abutting against an inner surface of one of the pair of bearing arms to absorb play between the screw-engagement follower and the pair of bearing arms; and a guide shaft for guiding the lens frame linearly in the optical axis direction, the guide shaft being relatively movably inserted in both the pair of bearing arms and the screw-engagement follower.

It is desirable for the screw-engagement follower to be made of synthetic resin.

It is desirable for the elastically deformable leg to be provided with a through-hole in which the guide shaft is loosely inserted so as to move relative thereto.

It is desirable for at least one of the elastically deformable leg of the screw-engagement follower and the bearing arm against which the elastically deformable leg abuts to be provided with a flexure providing projection which abuts against the other to provide a flexure thereto.

It is desirable for the screw engagement portion of the screw-engagement follower, in which the lead screw is located, to have a U-shaped cross section, wherein a pair of parallel plates defining the U-shaped cross section are provided, on at least one of opposed inner surfaces thereof, with rack teeth which engage with the lead screw.

The present disclosure relates to subject matter contained in Japanese Patent Application No. 2004-27356 (filed on Feb. 3, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
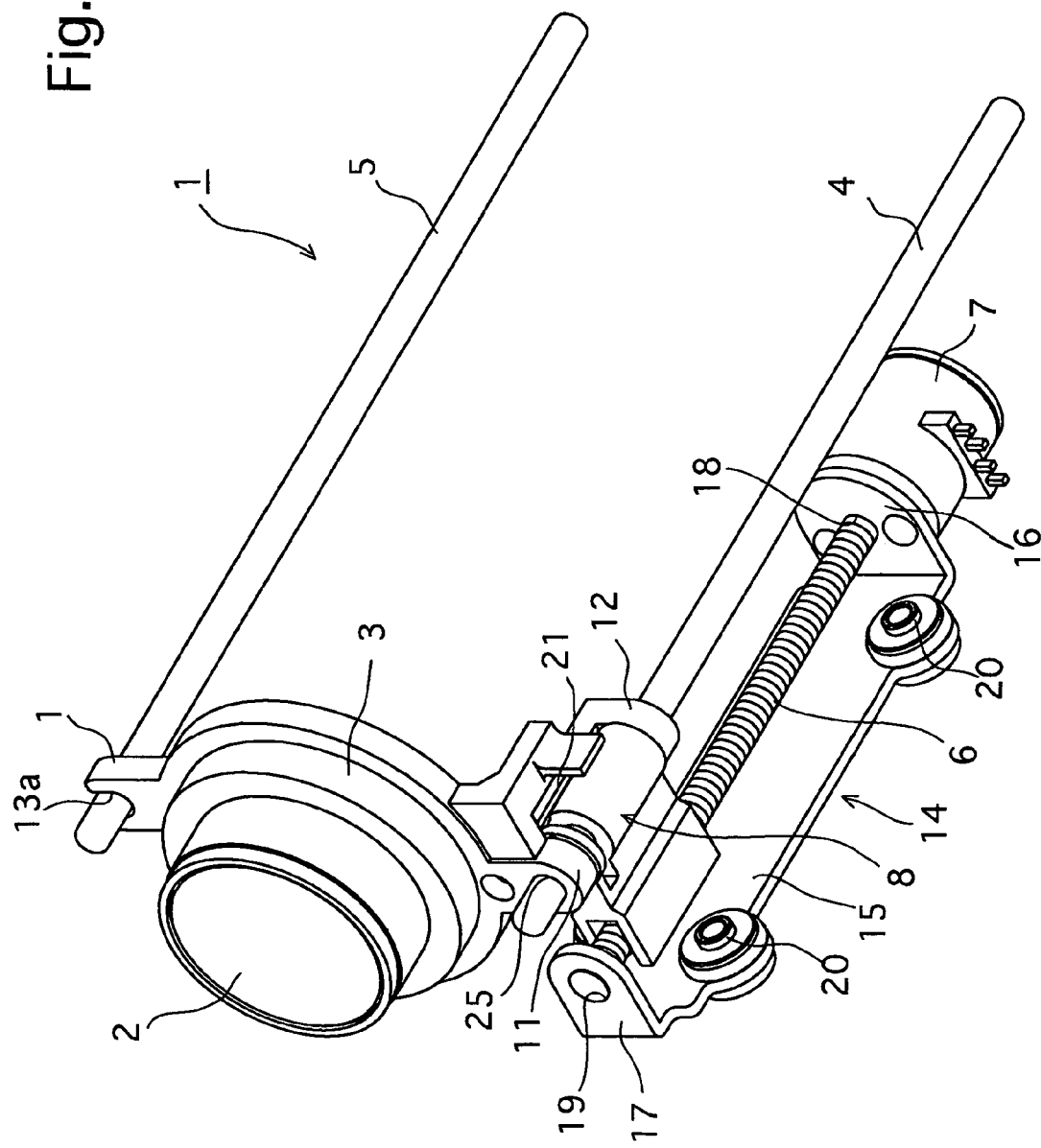
FIG. 1 is a perspective view of an embodiment of a lens moving mechanism according to the present invention.
Figure 2:
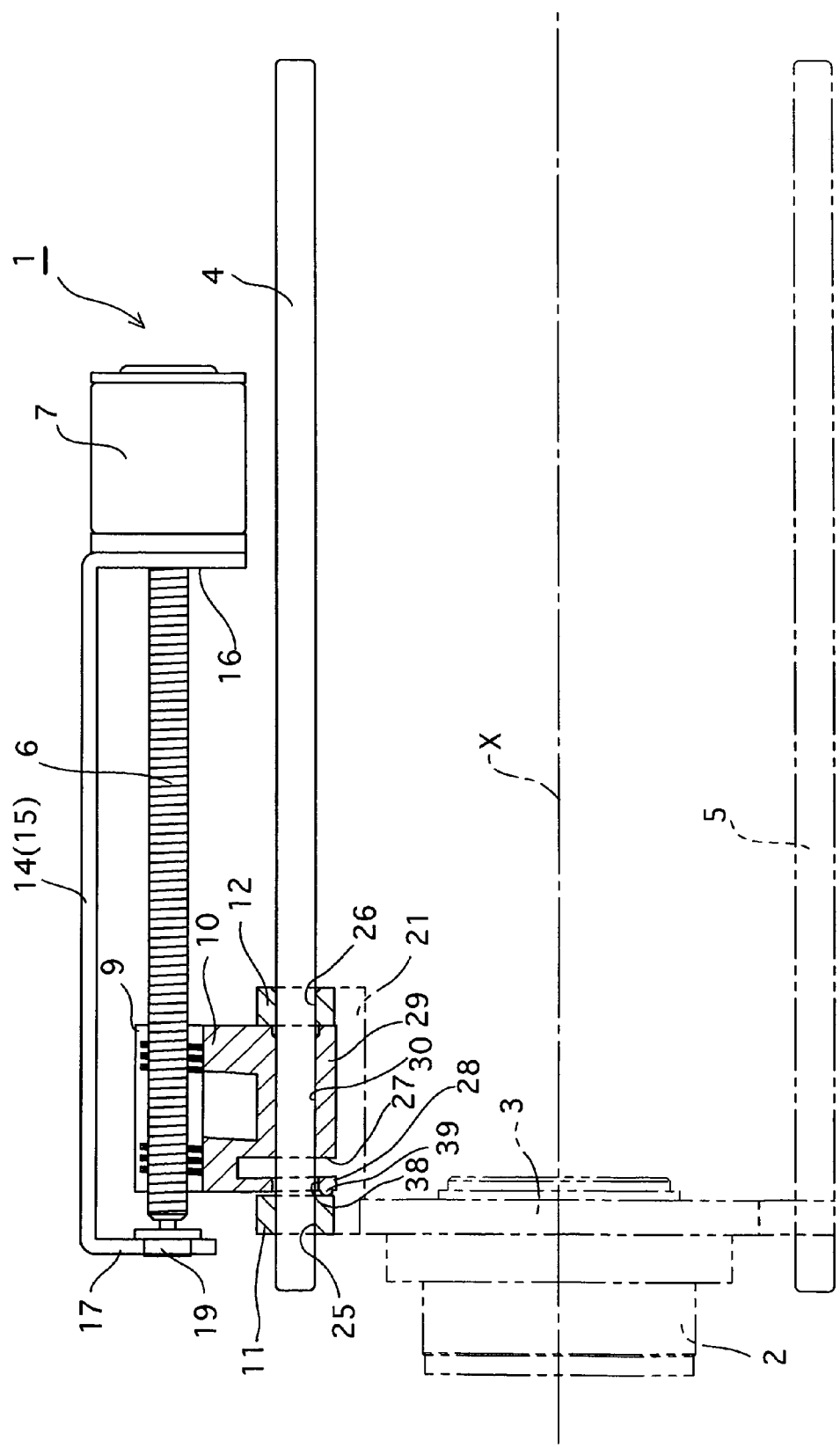
FIG. 2 is a sectional view of a rack member mounting structure in the lens moving mechanism according to the present invention.

A lens moving mechanism 1 of the present invention is used as a part of a photographing lens barrel of a camera. As can be seen in FIGS. 1 and 2, the lens moving mechanism includes a lens frame 3 which holds a lens 2, a pair of guide shafts 4 and 5 secured to a camera body on opposite sides of the lens frame 3 and extending parallel with the optical axis, and a lead screw (feed screw) 6 located adjacent to the guide shaft 4 and extending parallel with the guide shaft 4. The lead screw 6 is located substantially at the same circumferential position as the guide shaft 4 with respect to the optical axis X, i.e., the lead screw 6 is positioned from the guide shaft 4 in a direction perpendicular to the radial direction of the lens barrel.

Figure 3:
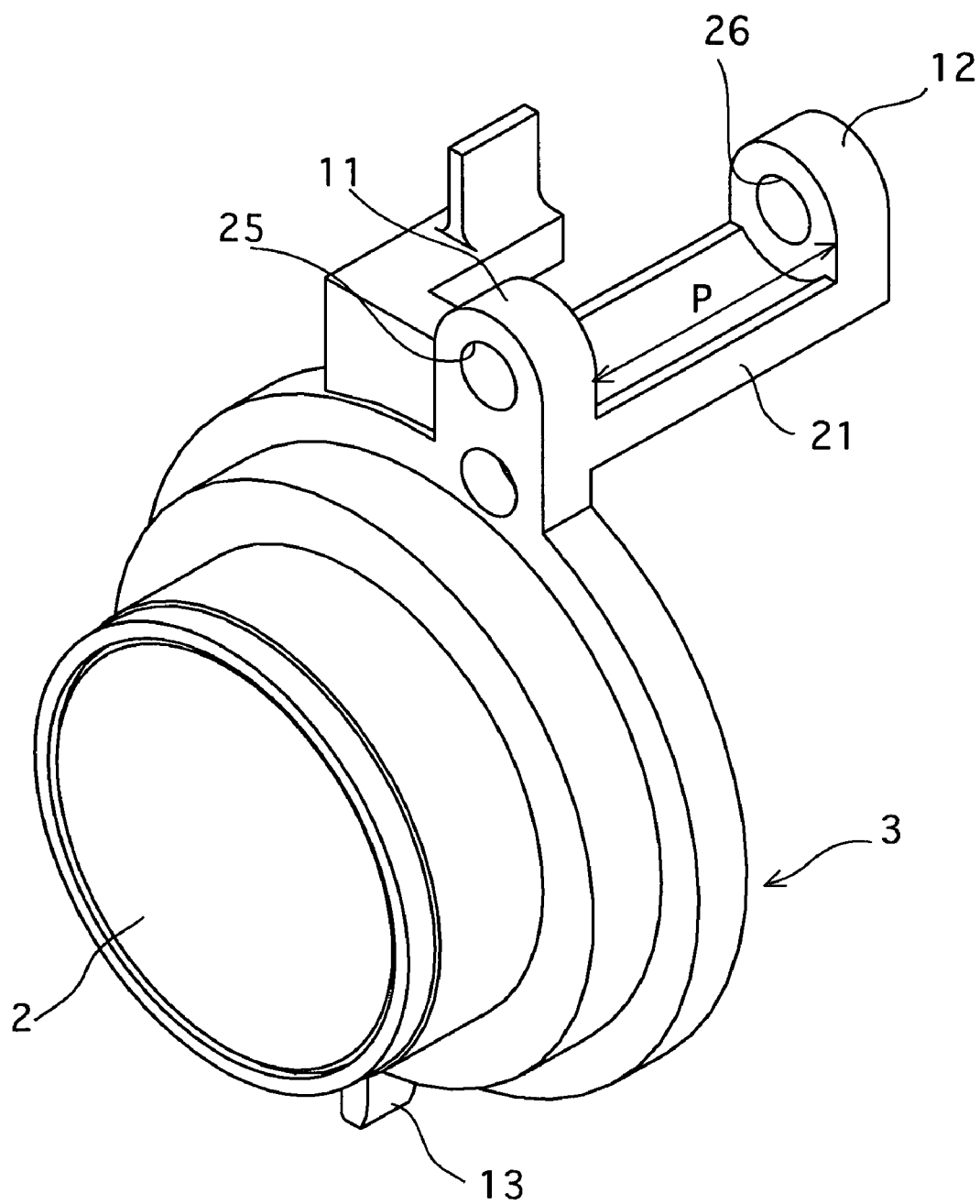
FIG. 3 is a perspective view of a lens frame in the lens moving mechanism according to the present invention.

As best seen in FIG. 3, the lens frame 3 is provided with a support arm 21 which extends from an outer edge of the lens frame 3 in a direction parallel with the optical axis. The support arm 21 is provided with a pair of bearing arms 11 and 12 which are spaced from one another at a distance P (distance between the inner walls thereof) in the direction of the guide shaft 4 parallel with the optical axis. The bearing arms 11 and 12 are provided with insertion holes 25 and 26, respectively, through which the guide shaft 4 slidably extends.

The lens frame 3 is provided, on the side thereof opposite to the support arm 21, with a bifurcated arm 13 corresponding to the guide arm 5. The bifurcated arm 13 is provided with a radial guide groove 13a (FIG. 1) in which the guide shaft 5 is slidably inserted. The distance P of the bearing arms 11 and 12, the inner diameter of the insertion holes 25 and 26, and the radial guide groove 13a of the bifurcated arm 13 are determined so that the lens frame 3 can be precisely moved in the optical axis direction X along the guide shafts 4 and 5.

A stepping motor (drive source) 7 for rotating the lead screw 6 is secured to a bracket 14 attached to the camera body. The bracket 14 is U-shaped and is provided with a bottom plate 15 extending parallel with the lead screw 6 and side walls 16 and 17 which extend from the ends of the bottom plate 15. The stepping motor 7 is secured to the side wall 16. The side wall 16 is provided with an insertion hole 18 through which the lead screw 6 extends. The side wall 17 is provided with a support hole 19 for supporting the lead screw 6. Mounting holes 20 are formed in the bottom plate 15 for securing the bracket 14 to the camera body.

Figure 4:
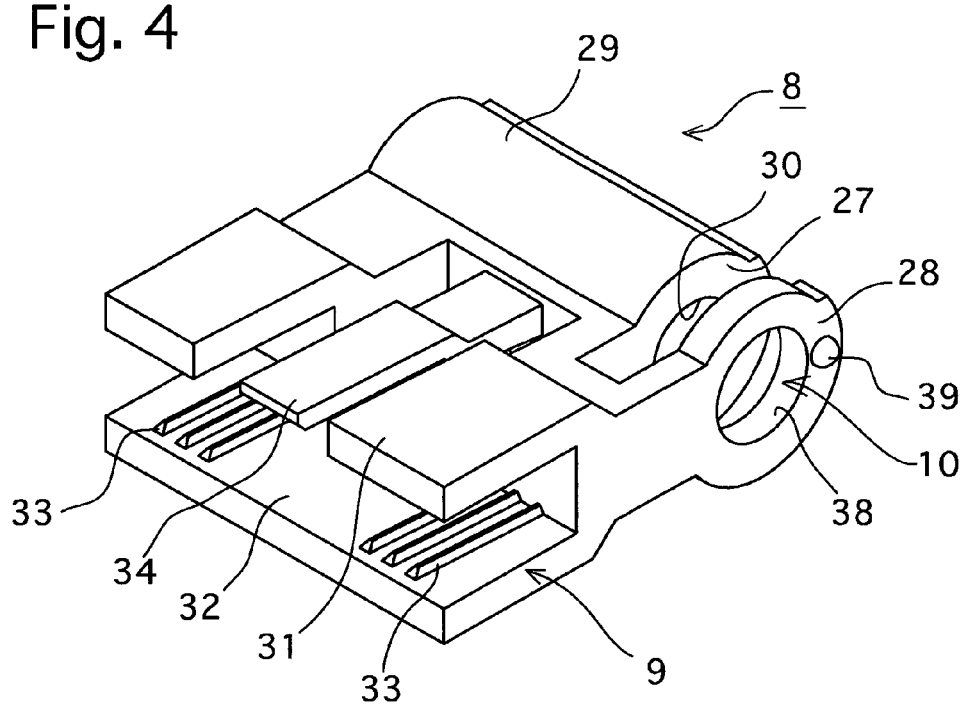
FIG. 4 is a perspective view of the rack member in the lens moving mechanism according to the present invention.
Figure 5:
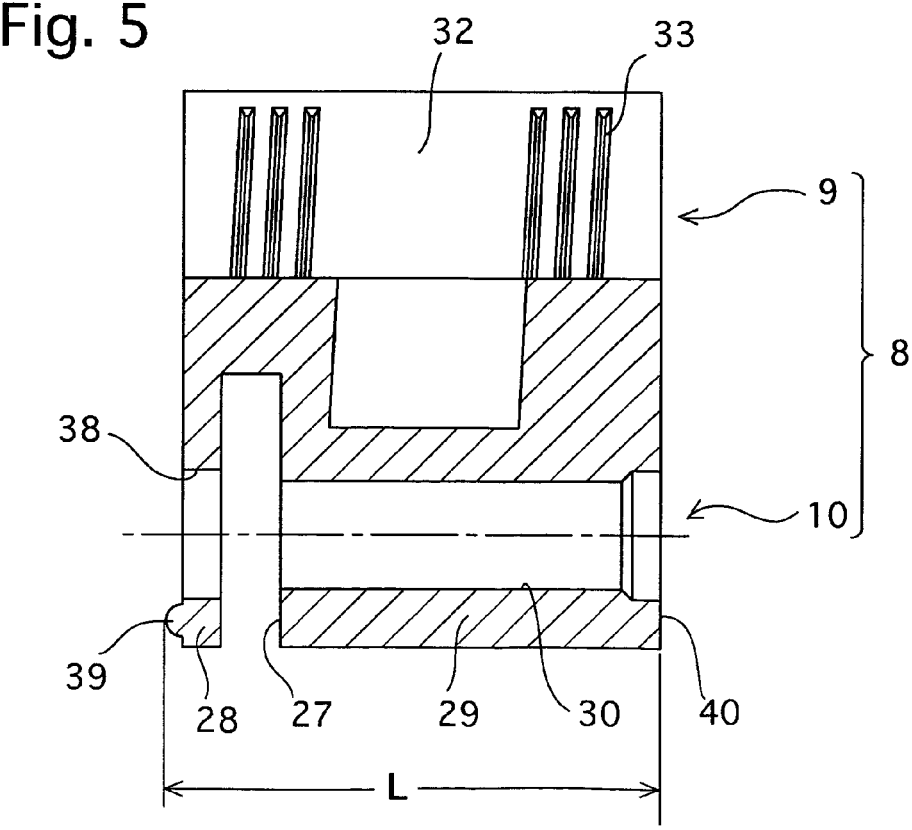
FIG. 5 is a sectional view of the rack member in the lens moving mechanism according to the present invention.

A rack member (screw-engagement follower) 8 is provided between the bearing arms 11 and 12, and is linearly moved along the guide shaft 4 in accordance with the rotation of the lead screw 6. The shape of the rack member 8 is shown in FIGS. 4 and 5. The rack member 8 is made of a synthetic resin mold and is provided with a lead screw engagement portion 9, which engages with the lead screw 6, and an insertion portion 10, in which the guide shaft 4 is slidably inserted. In other words, the guide shaft 4 and the lead screw 6 are spaced at a distance corresponding to the distance between the insertion portion 10 of the rack member 8 and the lead screw engagement portion 9.

The lead screw engagement portion 9 is in the form of a U-shape in cross section, with the side opposite to the insertion portion 10 being open. The lead screw engagement portion 9 is provided with a pair of opposed parallel plate portions 31 and 32. The plate portion 31 is provided on its central portion with an elastically deformable tongue portion 34 which is formed by cutting the plate portion 31. The plate portion 32 is provided, on its inner surface portion other than the portion corresponding to the elastically deformable tongue portion 34, with rack teeth 33 which engage (in mesh) with the lead screw 6. The lead screw engagement portion 9 normally permits the rack member 8, which cannot rotate, to linearly move through the rack teeth 33 in accordance with the rotation of the lead screw 6. However, if the lead screw 6 continues rotating in the same direction (overload is applied) after the rack member 8 abuts against the side wall 16 or 17 of the bracket 14, the parallel plate portions 31 and 32 are deformed with respect to the lead screw 6, so that no breakage of the lead screw engagement portion occurs.

The insertion portion 10 is received between the bearing arms 11 and 12 and is provided with a bearing portion 29 and an elastically deformable leg 28 separated from the bearing portion 29 by a slit 27. The elastically deformable leg 28 abuts against the inner surface of the bearing arm 11 to hold the rack member 8 between the bearing arms 11 and 12 without play. The bearing portion 29 and the elastically deformable leg 28 are provided with through-holes 30 and 38 aligned on the same axis, so that the guide shaft 4 is relatively slidably fitted in the through-holes 30 and 38, respectively. The diameter of the through-hole 30 is such that the guide shaft 4 is snugly fitted therein with minimum clearance therebetween so that the rack member 8 can be precisely moved in a direction parallel with the optical axis. The diameter of the through-hole 38 is such that a clearance between the guide shaft 4 and the through-hole 38 is large enough to enable the elastically deformable leg 28 to be freely elastically deformed with respect to the guide shaft 4.

The elastically deformable leg 28 has a free end opposite to the lead screw engagement portion 9, so that the free end can be elastically deformed by a maximum amount. The free end of the elastically deformable leg 28 is provided on its front side with a flexure providing projection 39 which is opposed to and abuts against the inner surface of the bearing arm 11. The length L (FIG. 5) from the front end of the flexure providing projection 39 to the end face 40 of the rack member 8 in a free state is slightly larger than the distance P (FIG. 3) of the pair of bearing arms 11 and 12, so that when the entirety of the insertion portion 10 is received between the bearing arms 11 and 12, the elastically deformable leg 28 is elastically deformed toward the bearing portion 29. Consequently, in an accommodated state, there is no play between the rack member 8 and the bearing arms 11 and 12. Moreover, as the elastically deformable tongue 34 presses the lead screw 9, the tooth surfaces of the rack teeth 33 and the flanks of the lead screw 6 are brought into close contact with each other, so that no backlash between the lead screw 6 and the rack teeth 33 occurs.

Namely, in the lens moving mechanism of the present invention, when the lead screw 6 is rotated in the forward or reverse direction by the stepping motor 7, the rotation is converted into the linear movement of the rack member 8 which is guided by the guide shaft 4 to move linearly through the rack teeth 33 of the lead screw engagement-portion 9. The insertion portion 10 of the rack member 8 is received between the bearing arms 11 and 12 of the lens frame 3 and is engaged with the lens frame 3 without play due to the bearing portion 29 and the elastically deformable leg 28. Therefore, the movement of the rack member 8 is transmitted to the lens frame 3 reliably and precisely. Since the lens frame 3 (the pair of bearing arms 11 and 12 thereof) and the rack member 8 (the insertion portion 10 thereof) are supported and guided by the same guide shaft 4 and there is no play between the elastically deformable leg 28 of the rack member 8 and the bearing arm 11, a small lens moving mechanism can be achieved.

Although the through-hole 38 in which the guide shaft 4 is loosely inserted is provided in the elastically deformable leg 28 in the illustrated embodiment, it is not necessary to provide the through-hole 38 if the position of the elastically deformable leg 28 is modified appropriately. For example, the elastically deformable leg 28 can be modified so as to extend to an eccentric point with respect to the center axis of the guide shaft 4, at an extended radial position outside the guide shaft 4. Furthermore, it is possible to provide the flexure providing projection 39 which abuts against the elastically deformable leg 28 on the inner surface of the bearing arm 11, in place of providing the flexure providing projection 39 on the elastically deformable leg 28. Although the lead screw engagement portion 9 of the rack member 8 is provided with a pair of parallel plate portions 31 and 32 to define a U-shape in cross section, in order to absorb an overload if applied, in the illustrated embodiment, if there is no chance of overload occurring, the shape of the screw engagement portion which engages with the lead screw 6 can be simplified.

Moreover, although the above discussion has been addressed to an embodiment applied to a lens moving mechanism which is incorporated in a camera, the present invention can be applied to other optical devices other than a camera.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens moving mechanism comprising:
    a lens frame which holds a lens;
    a guide shaft for slidably supporting said lens frame, said guide shaft extending parallel with an optical axis of said lens;
    a lead screw which extends parallel to the guide shaft for moving the lens frame linearly via a rotational force of said lead screw;
    a pair of bearing arms provided on said lens frame spaced from one another in a direction parallel with the guide shaft; and
    a screw-engagement follower which is located between said pair of bearing arms and is provided separately from said lens frame, said screw-engagement follower being provided with a screw-engagement portion which engages with said lead screw,
    wherein said guide shaft is relatively movably inserted in both said pair of bearing arms and said screw-engagement follower, and
    wherein said screw-engagement follower is integrally provided with an elastically deformable leg which elastically abuts against an inner surface of one of said pair of bearing arms to absorb play between said screw-engagement follower and said pair of bearing arms.

2. The lens moving mechanism according to claim 1, wherein said screw-engagement follower is made of synthetic resin.

3. The lens moving mechanism according to claim 1, wherein the elastically deformable leg is provided with a through-hole in which the guide shaft is loosely inserted so as to move relative thereto.

4. The lens moving mechanism according to claim 1, wherein at least one of the elastically deformable leg of the screw-engagement follower and an adjacent one of said pair of bearing arms, against which the elastically deformable leg abuts, is provided with a flexure providing projection which abuts against the other of said elastically deformable leg and said adjacent bearing arm to provide a flexure thereto.

5. The lens moving mechanism according to claim 1, wherein the screw engagement portion of the screw-engagement follower, in which the lead screw is located, has a U-shaped cross section, wherein a pair of parallel plates defining said U-shaped cross section are provided, on at least one of opposed inner surfaces thereof, with rack teeth which engage with said lead screw.

6. A lens moving mechanism comprising:
    a lens frame which holds a lens, said lens frame being provided with a pair of bearing arms which are spaced from one another in an optical axis direction;
    a screw-engagement follower which is located between said pair of bearing arms and is provided separately from said lens frame, said screw-engagement follower being linearly moved by rotating a lead screw extending in the optical axis direction;
    an elastically deformable leg which is provided integrally with the screw-engagement follower, said elastically deformable leg abutting against an inner surface of one of said pair of bearing arms to absorb play between said screw-engagement follower and said pair of bearing arms; and
    a guide shaft for guiding said lens frame linearly in the optical axis direction, said guide shaft being relatively movably inserted in both said pair of bearing arms and said screw-engagement follower.

7. The lens moving mechanism according to claim 6, wherein said screw-engagement follower is made of synthetic resin.

8. The lens moving mechanism according to claim 6, wherein the elastically deformable leg is provided with a through-hole in which the guide shaft is loosely inserted so as to move relative thereto.

9. The lens moving mechanism according to claim 6, wherein at least one of the elastically deformable leg of the screw-engagement follower and the bearing arm against which the elastically deformable leg abuts is provided with a flexure providing projection which abuts against the other to provide a flexure thereto.

10. The lens moving mechanism according to claim 6, wherein the screw engagement portion of the screw-engagement follower, in which the lead screw is located, has a U-shaped cross section, wherein a pair of parallel plates defining said U-shaped cross section are provided, on at least one of opposed inner surfaces thereof, with rack teeth which engage with said lead screw.

* * * * *